(12) United States Patent
Blaikie, III et al.

(10) Patent No.: US 12,430,668 B2
(45) Date of Patent: Sep. 30, 2025

(54) SYSTEM FOR TOKENIZED UTILIZATION OF INVESTMENT INFORMATION

(71) Applicant: Datavault AI Inc., New York, NY (US)

(72) Inventors: Alfred Blair Blaikie, III, Tinton Falls, NJ (US); Nathaniel T. Bradley, Tucson, AZ (US); Joshua S. Paugh, Tucson, AZ (US)

(73) Assignee: DATAVAULT AI INC., Beaverton, OR (US)

( * ) Notice: Subject to any disclaimer, the term of this patent is extended or adjusted under 35 U.S.C. 154(b) by 0 days.

(21) Appl. No.: 17/704,905

(22) Filed: Mar. 25, 2022

(65) Prior Publication Data

US 2022/0215439 A1    Jul. 7, 2022

Related U.S. Application Data

(63) Continuation of application No. 16/870,689, filed on May 8, 2020, now Pat. No. 11,315,150.
(Continued)

(51) Int. Cl.
G06Q 30/02        (2023.01)
G06Q 30/0251     (2023.01)

(52) U.S. Cl.
CPC ..... *G06Q 30/0269* (2013.01); *G06Q 30/0255* (2013.01); *G06Q 30/0261* (2013.01)

(58) Field of Classification Search
CPC ........... G06Q 30/0269; G06Q 30/0255; G06Q 30/0261
See application file for complete search history.

(56) References Cited

U.S. PATENT DOCUMENTS 7,860,763 B1    12/2010  Quinn
8,204,805 B2     6/2012  Eftekhari
(Continued)

FOREIGN PATENT DOCUMENTS

CN    108537664 A    9/2018
WO    2017190175 A1  11/2017
(Continued)

OTHER PUBLICATIONS

International Search Report and Written Opinions, PCT/US2022/075985, Dec. 6, 2022, 12 Pages.
(Continued)

*Primary Examiner* — Scott C Anderson
(74) *Attorney, Agent, or Firm* — Goodhue, Coleman & Owens, P.C.

(57) ABSTRACT

A system, method, device, and platform. The system includes electronic devices that execute a data application. The data application determines investment information associated with the user. A data platform accessible by the electronic devices through one or more networks executes the data application to receive the investment information for the user, tokenize the investment information in one or more blockchain tokens, reconcile the investment information with the available advertising data, create targeted advertisements based on the one or more blockchain tokens and available advertising content, and communicate the targeted advertisements to the user through one ore more consumer electronic devices.

20 Claims, 6 Drawing Sheets

Related U.S. Application Data

(60) Provisional application No. 62/908,252, filed on Sep. 30, 2019, provisional application No. 62/845,057, filed on May 8, 2019.

(56) References Cited

U.S. PATENT DOCUMENTS

| | | |
|---|---|---|
| 8,838,492 B1 | 9/2014 | Baker |
| 9,530,143 B2 * | 12/2016 | Bender .............. G06Q 30/0255 |
| 9,760,953 B1 | 9/2017 | Wang |
| 9,870,588 B1 | 1/2018 | Genov |
| 10,114,969 B1 | 10/2018 | Chaney et al. |
| 10,163,129 B1 | 12/2018 | Agarwal et al. |
| 10,255,641 B1 | 4/2019 | Goldman |
| 10,318,979 B2 | 6/2019 | Frank et al. |
| 10,341,105 B2 | 7/2019 | Innes et al. |
| 10,346,826 B2 | 7/2019 | Boudville |
| 10,482,174 B1 | 11/2019 | Goodsitt |
| 10,628,894 B1 | 4/2020 | Ioannou |
| 10,685,407 B1 | 6/2020 | Cabrera |
| 10,867,355 B1 | 12/2020 | Wang |
| 10,943,309 B1 | 3/2021 | Morin |
| 11,269,665 B1 | 3/2022 | Podgorny |
| 11,436,642 B1 * | 9/2022 | Podgorny .......... G06Q 30/0256 |
| 2004/0128253 A1 | 7/2004 | Jim |
| 2007/0250700 A1 | 10/2007 | Sidhu et al. |
| 2007/0288312 A1 | 12/2007 | Wang |
| 2009/0157534 A1 | 6/2009 | Arsiwala |
| 2010/0076876 A1 | 3/2010 | Brady |
| 2010/0179860 A1 | 7/2010 | Noel |
| 2011/0208621 A1 | 8/2011 | Feierstein |
| 2012/0323718 A1 | 12/2012 | Shkedi |
| 2013/0132300 A1 | 5/2013 | Margolis |
| 2014/0164251 A1 | 6/2014 | Loh |
| 2014/0214636 A1 | 7/2014 | Rajsky |
| 2014/0344015 A1 | 11/2014 | Puértolas-Montañés et al. |
| 2015/0095261 A1 * | 4/2015 | Globe ................... G06Q 40/06 705/36 R |
| 2015/0310476 A1 * | 10/2015 | Gadwa ............... G06Q 30/0226 705/14.27 |
| 2016/0104153 A1 | 4/2016 | Anderson et al. |
| 2016/0140668 A1 | 5/2016 | Maguire |
| 2016/0342977 A1 | 11/2016 | Lam |
| 2017/0011350 A1 * | 1/2017 | Jones-McFadden. ........................ G06Q 10/1095 |
| 2017/0011460 A1 | 1/2017 | Molinari |
| 2017/0111345 A1 | 4/2017 | Heiman et al. |
| 2017/0126644 A1 | 5/2017 | Ullrich et al. |
| 2017/0134161 A1 | 5/2017 | Goeringer et al. |
| 2017/0169363 A1 | 6/2017 | Salmasi et al. |
| 2017/0206523 A1 | 7/2017 | Goeringer et al. |
| 2017/0214522 A1 | 7/2017 | Code et al. |
| 2017/0220540 A1 | 8/2017 | Wang |
| 2017/0221029 A1 | 8/2017 | Lund et al. |
| 2017/0230109 A1 | 8/2017 | Kawai |
| 2017/0243143 A1 | 8/2017 | Engstrom |
| 2017/0295023 A1 | 10/2017 | Madhavan et al. |
| 2017/0301026 A1 | 10/2017 | Bensemana |
| 2017/0301031 A1 | 10/2017 | Naqvi |
| 2017/0330174 A1 | 11/2017 | DeMarinis et al. |
| 2017/0337534 A1 | 11/2017 | Goeringer et al. |
| 2017/0346833 A1 | 11/2017 | Zhang |
| 2017/0372278 A1 | 12/2017 | Frolov et al. |
| 2018/0040073 A1 | 2/2018 | Ghosh |
| 2018/0101771 A1 | 4/2018 | Schwarm |
| 2018/0121337 A1 | 5/2018 | Unsal |
| 2018/0144153 A1 | 5/2018 | Pead |
| 2018/0144340 A1 | 5/2018 | Kinnaird et al. |
| 2018/0218456 A1 | 8/2018 | Kolb |
| 2018/0225693 A1 | 8/2018 | Postrel |
| 2018/0232775 A1 | 8/2018 | Kim et al. |
| 2018/0262493 A1 | 9/2018 | Andrade |
| 2018/0276626 A1 | 9/2018 | Laiben |
| 2018/0300693 A1 | 10/2018 | Gopinath et al. |
| 2018/0300772 A1 | 10/2018 | Bushong, Jr. |
| 2018/0314884 A1 | 11/2018 | Lee |
| 2018/0351949 A1 | 12/2018 | Scott et al. |
| 2018/0365686 A1 | 12/2018 | Kondo |
| 2019/0019208 A1 | 1/2019 | Postrel |
| 2019/0019218 A1 | 1/2019 | Thompson et al. |
| 2019/0026828 A1 | 1/2019 | Preston et al. |
| 2019/0043050 A1 | 2/2019 | Smith et al. |
| 2019/0050926 A1 | 2/2019 | Cooper |
| 2019/0052722 A1 | 2/2019 | Gasking |
| 2019/0058580 A1 | 2/2019 | Tormasov et al. |
| 2019/0066063 A1 | 2/2019 | Jessamine |
| 2019/0066205 A1 | 2/2019 | Marks |
| 2019/0066206 A1 | 2/2019 | Marks |
| 2019/0080402 A1 | 3/2019 | Molinari et al. |
| 2019/0080407 A1 | 3/2019 | Molinari et al. |
| 2019/0087844 A1 | 3/2019 | Eekley et al. |
| 2019/0087893 A1 | 3/2019 | Pellew |
| 2019/0095439 A1 | 3/2019 | Cai |
| 2019/0102454 A1 | 4/2019 | Sato et al. |
| 2019/0102837 A1 | 4/2019 | Smith et al. |
| 2019/0114334 A1 * | 4/2019 | Gunther ................ H04L 9/3297 |
| 2019/0114706 A1 | 4/2019 | Bell et al. |
| 2019/0121813 A1 | 4/2019 | Galebach et al. |
| 2019/0122073 A1 * | 4/2019 | Ozdemir ................ G06V 20/56 |
| 2019/0122243 A1 | 4/2019 | Mizzone |
| 2019/0122258 A1 | 4/2019 | Bramberger et al. |
| 2019/0130451 A1 | 5/2019 | Logvinov |
| 2019/0141048 A1 | 5/2019 | Fallah et al. |
| 2019/0147471 A1 | 5/2019 | McKelvey et al. |
| 2019/0149633 A1 | 5/2019 | Evans et al. |
| 2019/0155997 A1 | 5/2019 | Vos et al. |
| 2019/0156304 A1 | 5/2019 | Hudson et al. |
| 2019/0156363 A1 | 5/2019 | Postrel |
| 2019/0163700 A1 | 5/2019 | Baumgardner et al. |
| 2019/0164140 A1 | 5/2019 | Pasupula |
| 2019/0172067 A1 | 6/2019 | Arora et al. |
| 2019/0172153 A1 | 6/2019 | Wyle et al. |
| 2019/0180266 A1 | 6/2019 | Sidhu |
| 2019/0180307 A1 | 6/2019 | Cohen et al. |
| 2019/0188411 A1 | 6/2019 | Kroutik |
| 2019/0205563 A1 | 7/2019 | Gonzales |
| 2019/0205932 A1 | 7/2019 | Ericson |
| 2019/0213633 A1 | 7/2019 | Kokernak |
| 2019/0236214 A1 | 8/2019 | Kokernak |
| 2019/0236286 A1 | 8/2019 | Scriber et al. |
| 2019/0236698 A1 | 8/2019 | Postrel |
| 2019/0244243 A1 | 8/2019 | Goldberg et al. |
| 2019/0311353 A1 * | 10/2019 | Solis ........................ G06F 21/64 |
| 2019/0312941 A1 * | 10/2019 | Maccini ................ H04H 60/33 |
| 2019/0325486 A1 * | 10/2019 | Fujimoto ............. G06Q 20/065 |
| 2019/0342095 A1 | 11/2019 | Simons |
| 2019/0347442 A1 | 11/2019 | Marlin |
| 2020/0058023 A1 | 2/2020 | Travizano |
| 2020/0074461 A1 | 3/2020 | DeRosa-Grund |
| 2020/0234268 A1 | 7/2020 | Kohli |
| 2020/0236091 A1 | 7/2020 | Cooley |
| 2020/0394723 A1 | 12/2020 | Baker et al. |
| 2021/0192075 A1 | 6/2021 | Sweeney |
| 2022/0309540 A1 | 9/2022 | Blaikie, III et al. |
| 2022/0309541 A1 | 9/2022 | Blaikie, III et al. |

FOREIGN PATENT DOCUMENTS

| | | |
|---|---|---|
| WO | 2017197110 A1 | 11/2017 |
| WO | 2018007828 A2 | 1/2018 |
| WO | 2018058105 A1 | 3/2018 |
| WO | 2018209153 A1 | 11/2018 |
| WO | 2018211382 A1 | 11/2018 |
| WO | 2019051401 A1 | 3/2019 |
| WO | 2019083693 A1 | 5/2019 |
| WO | 2019094153 A1 | 5/2019 |
| WO | 2019099335 A1 | 5/2019 |
| WO | 2019113138 A1 | 6/2019 |
| WO | 2019121659 A1 | 6/2019 |

(56) References Cited

FOREIGN PATENT DOCUMENTS

| WO | 2019133309 A1 | 7/2019 |
| WO | 2019152732 A1 | 8/2019 |

OTHER PUBLICATIONS

Saraji et al. "A blockchain-based carbon credit ecosystem." (2021). Jul. 1, 2021 (Jul. 1, 2021} Retrieved on Oct. 24, 2022 (Oct. 24, 2022) from . 12 pages.

International Preliminary Report, PCT/US2019/059920, May 20, 2021, 8 pages.

International Search Report & Written Opinion, PCT/US2020/025495, Jul. 2, 2020, 15 pages.

* cited by examiner

SYSTEM FOR TOKENIZED UTILIZATION OF INVESTMENT INFORMATION

PRIORITY

This application is a continuation of U.S. patent application Ser. No. 16/870,689 filed on May 8, 2020 which claims priority to U.S. Provisional Patent Application Nos. 62/845,057 and 62/908,252 filed May 8, 2019 and Sep. 30, 2019, respectively, each of which is hereby incorporated by reference in their entirety.

BACKGROUND

I. Field of the Disclosure

The illustrative embodiments relate to personal data management. More specifically, but not exclusively, the illustrative embodiments relate to a network, system, method, apparatus, and platform for targeted advertising based on a profile and user preferences.

II. Description of the Art

Current forms of advertisements rely heavily on traditional blind advertising, such as radio and television. Even online targeting methods depend on semi-blind behavioral or demographic targeting based on cookies, website tracking, data points, and metrics. Statistics indicate that only 8% of Internet users account for 85% of the clicks on display advertisements and 56% of digital advertisements are never seen by a live human being. Internet advertisements may miss the mark by being undesirable, irrelevant, or server after a purchase has been consummated. As a result, many advertisements are irrelevant to users.

SUMMARY OF THE DISCLOSURE

The illustrative embodiments provide a system, method, device, and platform. The system includes electronic devices that execute a data application. The data application determines investment information associated with the user. A data platform accessible by the electronic devices through one or more networks executes the data application to receive the investment information for the user, tokenize the investment information in one or more blockchain tokens, reconcile the investment information with the available advertising data, create targeted advertisements based on the one or more blockchain tokens and available advertising content, and communicate the targeted advertisements to the user through one or more consumer electronic devices.

Another embodiment provides a number of electronic devices executing a data application. The data application determines investment information associated with a user. A data platform accessible by the number of electronic devices through one or more networks. The data platform executes the data application to receive the investment information for a user, tokenize the investment information in one or more blockchain tokens, reconcile the investment information with available advertising data, create targeted advertisements based on the one or more blockchain tokens and the available advertising content, and communicate the targeted advertisements to the user through one or more consumer electronic devices.

In other embodiments, the investment information may be a portfolio of the user including one or more stocks, equities, holdings, or interests associated with the user. The data platform may receive a user profile associated with the user through at least one of the electronic devices. The data platform may receive a user profile associated with the user through at least one of the electronic devices. The electronic devices may include one or more clearing houses representing trading clearing houses and credit card clearing houses. The targeted advertisements may support the portfolio of the user determined from the investment information. The investment information may be a portfolio of the user including one or more stocks, equities, holdings, or interests associated with the user. The data platform may determine whether the targeted advertisement is appropriate for the user based on the location and the activity of the user before communicating the targeted advertisement to the user. The data application may be configured to receive user preferences associated with the user. The targeted advertisements are generated utilizing the user preferences. A database in communication with the data platform saves the investment information. The user preferences specify how the investment information is utilized by the data platform.

The illustrative embodiments provide a system, method, device, and platform for generating targeted advertisements. Transaction information for a user is received. The transaction information associated with the user is verified. The information is reconciled with advertising data associated with the transaction information. Targeted advertisements are created based on the available advertising data. The targeted advertisements are communicated to the user.

Another embodiment provides a system for performing transactions for data. The system includes multiple electronic devices executing a data application. The data application is configured to determine investment information associated with the user. The system also includes a data platform accessible by the multiple electronic devices executing the data application through one or more networks. The data platform receives investment information for a user, reconciles the investment information with available advertising data, creates targeted advertisements associated with the investment information from the available advertising content, and communicates the targeted advertisements to the user through one or more consumer electronic devices.

Another embodiment provides a data platform. The data platform may include a processor for executing a set of instructions and a memory for storing the set of instructions. The set of instructions may be executed to receive investment information for a user, reconcile the investment information with available advertising data, create targeted advertisements associated with the investment information from the available advertising data, and communicate the targeted advertisements to the user.

The illustrative embodiments provide a system, method, and platform for performing transactions for data. The data is grouped. The data is associated with a platform. Transaction information for the data is received. One or more transactions are performed based on the transaction information. The verification of the transaction is provided. Another embodiment provides a processor for executing a set of instructions and a memory storing a set of instructions configured to perform the method herein described.

The illustrative embodiments provide a system, method, and platform for monetizing data. A selection is received from a user to monetize data associated with the user. The data associated with user is compiled. A security token is generated including the data. The data is monetized utilizing the security token in accordance with the selection.

In other embodiments, the data may include digital profiles that are monetized for data. Data validation may be performed through user opt-ins that are identified and confirmed by the user. Token based compensation for consumer data allows for the direct control and monetization of their data (e.g., web data, application data, profiles, personal measurements, readings, etc.). Compensation may be performed through digital currencies, hard currencies, charitable contributions, and tax deductions. The earnings for a user may also be donated. Users may be rewarded for additional data uploads, updates, additions, amendments, surveys/questionnaire fulfillment, and so forth. The tokens may be utilized to pay a vendor or third party for a product, service, system, or data, secure a digital asset, tracking the life of an asset, share a stake in an asset or company, participate in an initial coin offering, receive a reward, maintaining and managing a digital asset, make a charitable contribution, or receive a tax deduction.

Another illustrative embodiment provides a system, method, device, and platform for managing user data. One or more data elements associated with user data are received from one of a number of sources. The one or more data elements are automatically confirmed as applicable to a user. The one or more data elements are added to a data set associated with the user. A determination is made whether the data set is complete after adding the data element to the data set. One or more tokens are created based on the data set of the user. Another embodiment provides a processor for executing a set of instructions and a memory storing a set of instructions configured to perform the method herein described.

Another embodiment provides a system for utilizing user data. The system includes electronic devices executing a data application. The data application is configured to capture the user data associated with a user. The system also includes a data platform accessible by the electronic devices executing the data application through one or more networks. The data platform receives one or more data elements associated with the user data from the electronic devices, automatically confirms the one or more data elements are applicable to the user, adds the one or more data elements to a data set associated with the user, determines whether the data set is complete after adding the data element to the data set, and creates one or more tokens based on the data set of the user.

Another embodiment provides a data platform. The data platform may include a processor for executing a set of instructions and a memory for storing the set of instructions. The set of instructions may be executed to receive one or more data elements associated with the user data from one of a number of sources, automatically confirm the one or more data elements is applicable to the user, add the one or more data elements to a data set associated with the user, determine whether the data set is complete after adding the data element to the data set, and create one or more tokens based on the data set of the user.

In other embodiments, one or more of the following may be implemented. Instructions are received from the user specifying how the data set is utilized and the user is compensated for sharing the tokens with one or more interested parties. Additional data elements may be requested in response to determining the data set is incomplete utilizing questions, surveys, and a user profile associated with the user. The one or more data elements are authenticated as being associated with the user. The token is a block chain crypto token and points to the data set for secure access by one or more interested parties. Distinct data sets are clustered into a data pool, the data pool is cross populated with distinct data sets, and the data pool is segmented to identify saturation, missing, incomplete, or nonrelevant data. A determination is made regarding the relevance of the data pool to one or more interested parties. Payments are received from one or more interested parties to access the data set utilizing the token. One or more users are compensated for granting access to their data sets. The interested parties represent advertisers, marketers, or businesses that desire access to the user data in the data set. The illustrative embodiments provide a system, method, and platform for monetizing data. A selection is received from a user to monetize data associated with the user. The data associated with user is compiled. A security token is generated including the data. The data is monetized utilizing the security token in accordance with the selection.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
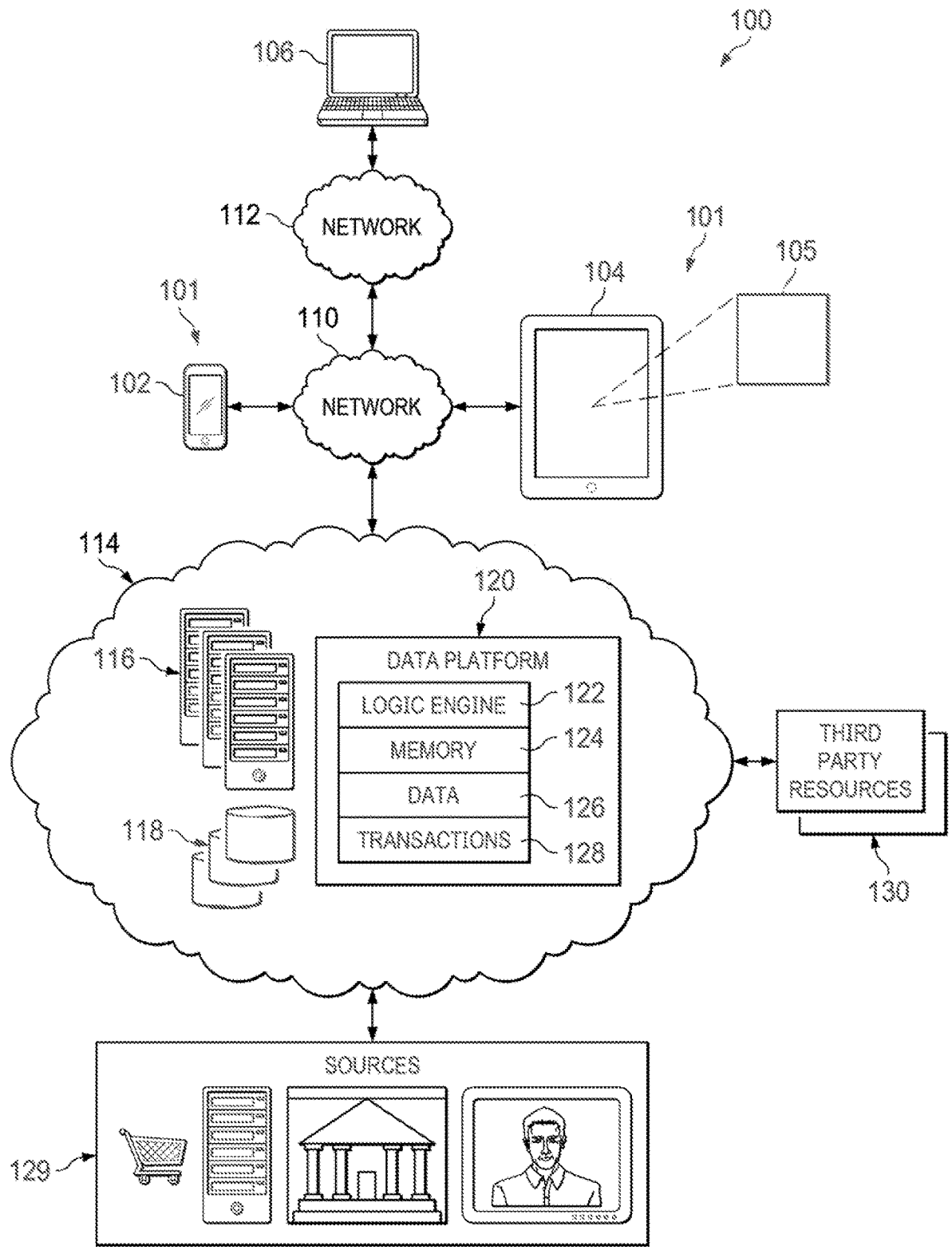
FIG. 1 is a pictorial representation of a system for managing user information in accordance with an illustrative embodiment.

The illustrative embodiments provide a network, system, method, platform and devices for data management and utilization that provides for equity holdings, credit card activity, and user specified parameters and preferences to be processed for the purpose of targeting advertisements to consumers. The illustrative embodiments create a relationship between data sets regarding ownership of stock portfolios, equities, and user associated interests and the products that consumers buy or are shopping for that are owned by the companies represented within their portfolios.

Data tracking and segmentation provides for improved real-time and online advertisements, product recommendations, stock tips and shopping recommendations via an ad-targeting network. The improvements allow advertisements to be selectively targeted based on consumer profiles that may include real-time and historical purchasing data and the real-time and historical stock and equity portfolios. Data from multiple primary sources may be leveraged towards the targeted advertising including stock trading data, stock custody data and consumer credit and debit card transaction data.

The advertising network data is processed, and advertisements are delivered to users/consumers so that they can act in their own best interests and purchase products, services, and commodities that are in alignment with their holdings. This technology tool provides investors who own stock in specific companies a means to support that stock ownership by receiving targeted purchase recommendations and advertisements that allows consumers them to make informed purchase decisions that facilitate and support the success of each stock held within own individual investor portfolio by purchasing those products. Alternatively, when users buy products outside the products represented in their portfolios, the user may receive data and advertisements from brokers to buy or switch to the stocks associated to those products.

The illustrative embodiments utilize data records from stock transactions, equities, credit card transactions, user preferences, and other self-interests to perform targeted advertisements. Different data clearing houses, groups, or parties may be utilized to process and verify user and consumer data. For example, every stock transaction including the stock, shares, amount, type of transaction (e.g., limit, market, short, futures transaction, option, etc.), and other information is received, processed, and stored.

The illustrative embodiments provide a system, method, platform, and network for encrypting, securing, developing, and managing data valuations, transactions, and utilization. The data may be accessible from any number of authorized and connected devices. The illustrative embodiments allow users/consumers, consumer groups, companies, organizations, entities, governments, and other parties worldwide to develop data strategies and the conversion of any data into a monetizable asset (including a transactable token currency). platform for capturing, identifying, monetizing, converting, utilizing, and improving data.

As referenced herein, data refers to the personal or commercial data, user profiles, web profiles, search profiles, application profiles, and other information applicable to a user, consumer, entity, device, system, or other party. The illustrative embodiments comply with all applicable data privacy and administration rules, laws, and best practices. Any number of mobile devices, computers, machines, servers, arrays, or so forth may be utilized to implement the illustrative embodiments. A user may tokenize his/her data and convert all applicable data into an asset that may be controlled, valued, and monetized in commercial transactions. The illustrative embodiments also provide the user the ability to control data generation and the seamless utilization of the data. For example, algorithmic processing may determine how and when online and digital data is utilized and monetized, the price point or fair data valuation based on applicable pricing (e.g., demographic, global, location, utilization, etc.) based on going rates, principles of supply and demand, market economics, market analysis, machine learning, exchanges, auctions, real-time bidding, artificial intelligence, and so forth. Relevant information regarding data utilization may be acquired in real-time, based on historical transactions/archives, selling prices, or other applicable information or data that informs the value of a data sale or transaction. The illustrative embodiments allow the end user to select advertisement preferences that coincide with their stocks/shares, ownerships, interests, holdings, demographics, opinions, behaviors, beliefs, social structure, purchase plans, and real-world desires.

The illustrative embodiments may be utilized to perform a transaction for the data. The data may be grouped, associated, and commoditized for any number of trades, exchanges, purchases, donations, or other transactions. The data may be associated with a platform for transactions involving the data and associated advertisements. The transaction may be performed automatically or based on user input, feedback, instructions, or commands.

One embodiment provides a blockchain based security token system that gives consumers the ability to control, monetize, and/or donate any or all of the proceeds from the utilization, sale, or sharing of their profile and/or data and advertising-based revenue. The illustrative embodiments curate or collect data in real-time from users based on an opt-in system with clear compensation and renumeration guidelines. For example, any number of computing or communications devices, platforms, applications, or so forth may be utilized to capture the data.

The security tokens utilized may represent any number of existing, custom/proprietary, and other tokens. In one embodiment, formatted, structured, or unstructured data may be converted into an encrypted token that represents, includes, or references the applicable data. The security interest in a data asset may be represented in the form of a token. Data across numerous fields and with different utilizations may be captured in a token (or tokenized). For example, intelligence, counterintelligence, consumer profiles, consumer/user, private, public, and other types of data may be captured and monetized. For example, the illustrative embodiments may provide a data management system that allows an asset, such as ownership of a digital profile to be tokenized as an asset that may be tracked, grown, and expanded through an opt in submission from multiple sources and monetized digitally through an e-commerce platform.

The security tokens may be issued, regulated, managed, and distributed by a platform to comply with the existing regulatory framework. The platform may provide a data monetization process for creating and performing transactions between buyers and sellers (e.g., similar to a stock trading platform). The illustrative embodiments may apply pricing based on a set price range, guidelines, industry-standard, or market rate. The data in the form of a token may allow the user to directly control and monetize their data in a transparent and secure blockchain platform. Consumers may receive security tokens in several ways when they sign up to participate in the system/service, when and where they opt in to include their data in the marketplace, and when corporations and/or third parties purchase or monetized access to their data. For example, the data may be managed within a self-directed and mobile computing environment. The illustrative embodiments allow users to determine how and when their data is shared and monetized eliminating guesswork used by search, advertising, and marketing companies to generate user approved and desired consumer marketing data.

In one embodiment, the asset of data is created by the opt-in submission of a user's stock/ownership/interest profile, trading profile/account, social network profile(s), website utilization profiles, or generic/customized profile, and the associated data. The platform may be further used to secure all rights to any revenue streams associated with the data asset (e.g., any sale, sharing, or monetization of the user profile to a third party, site, or advertiser). By opting into the program, the user is providing their profile and perfecting the profile to match their actual daily living and purchases of products. As a result, the illustrative embodiments put the user in full control of the use and monetization of their data while avoiding the erroneous or inaccurate use of information inherent in currently available advertising programs and systems. The illustrative embodiments take third-party unauthorized or on monetized used of poor user data and enables an accurate and monetized data stream to be created for the user. The user benefits as do the third parties that are using the more accurate data. For example, assets associated with the user (e.g., stocks, hedge funds, business entities, charitable organizations, etc.) may benefit by adding revenue, increasing in value/valuation, and otherwise benefiting the user.

The illustrative embodiments may enable the user to track utilization and monetization of their data in a more transparent fashion. As a result, the user may be able to see and track dividends, revenue sharing, price appreciation, or other forms of data asset monetization. For example, a value-based reward system tracked utilizing blockchain may be implemented. Smart contracts may be utilized with blockchain to ensure proper utilization and monetization of the data for verification purposes. The secured token generation process of the user data/profile provides proof of ownership to the user and ensures contract conditions are written into the smart contract code within the blockchain structure. The blockchain records maintain and track the creation, issuance, management, and monetization of each token throughout the lifetime of the user's involvement and ownership of their data. In one embodiment, a user may be rewarded with additional tokens for keeping their data/profile updated as well as for additional participation in surveys, watch a video, verify, a purchase, add studies, product marketing, expanded data provisioning, and questionnaires.

The user may be incentivized to provide additional data, such as pictures, audio content, videos, location (e.g., real-time, GPS, beacon, triangulation, delayed for safety, historical, etc.), Internet protocol address, identification of friends from each social network, sharing access to third-party applications, search data, views, likes, shares, comments, and so forth. As a result, the user may specify advertisement preferences that are associated with their stocks, portfolio, assets, equities, holdings, interests, demographics, opinions, behaviors, beliefs, social structure, purchase plans, and real-world desires. The user data that is recorded and stored may reside permanently on the blockchain, but typically only has a three-year lifecycle to be relevant. Thus, the user is incentivized to maintain, share, and update their data and associated profiles.

The data profile may be singular to a user or may be expanded to include deeper insights into a family, group of friends, employees, or other affiliated or associated groups. For example, a family circle profile may include an opt in for parents, children, grandparents, uncles, cousins, neighbors, family friends, and so forth. The data profile may be shared as a family asset between a partner, spouse, and children allowing the family data to be managed and monetized as a single asset. As a result, advertisers and others may get deeper insights into participating users. The illustrative embodiments manage the data collection, pricing, reconciliation, verification, payments, or so forth. Advertisers may be able to identify consumer data that is relevant to their campaign in order to provide direct incentives and/or monetization for users who provide specific advertiser-based insights. For example, a user may select to support a corporate restaurant of which a brother is a part-owner, an online educational institute that a friend works for, or a business that supports charities approved of by the user.

The illustrative embodiments may also allow user to transfer or donate the revenue or value generated for a charitable deduction or associated tax deduction. Each of the described data components is 100% opt in with users being rewarded for sharing specific data points that are desirable to advertisers or other third parties. For example, users may opt-out of specific data points that the do not wish to share with advertisers. The data captured by the illustrative embodiments may be consolidated and purchased by advertisers who provide incentives, rewards, or donations in exchange for access to users and focus group data used for the mining of advertiser-based user insights, analytics, marketing, and advertisement targeting.

The illustrative embodiments may also be utilized to create a data index that catalogs user profiles, data sets, and data transactions. Advertisers may then select a pricing structure for each type of data profile component that is desirable to advertisers thereby creating a virtual market for advertisers to purchase real time user data. The changing values of the data may be tracked over time for specific user profiles, consumer groups, and data pools based on their value to advertisers. The use of security tokens tied to user profiles creates a marketable asset that gives greater validity to commercial uses of blockchain technologies and the security token market.

Security tokens may be exchanged for actual currency, preferred stock options, stock warrants, bonds, exchange traded fund (ETF) shares, cryptic or, initial coin offerings (ICO), gift cards, vouchers, and other forms of compensation.

FIG. 1 is a pictorial representation of a system 100 for managing user information in accordance with an illustrative embodiment. In one embodiment, the system 100 of FIG. 1 may include any number of devices 101, networks, components, software, hardware, and so forth. In one example, the system 100 may include a smart phone 102, a tablet 104 displaying graphical user interface 105, a laptop 106 (altogether devices 101), a network 110, a network 112, a cloud system 114, servers 116, databases 118, a data platform 120 including at least a logic engine 122, a memory 124, data 126, and transactions 128. The cloud system 114 may further communicate with sources 131 and third-party resources 130.

Each of the devices, systems, and equipment of the system 100 may include any number of computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system 100 may be utilized by any number of users, organizations, or providers to aggregate, manage, review, analyze, process, distribute, advertise, market, display, and/or monetize data 126. For example, the data 126 may be utilized in marketing or advertisements for goods or services associated with the stock, equity, holdings, ownership, or interests of each user (as well as family and friends as allowed or specified). In one embodiment, the goods and services represent any number of items, content, products, or services sold by a business, entity, organization, or entity. In one embodiment, the system 100 may utilize any number of secure identifiers (e.g., passwords, pin numbers, certificates, etc.), secure channels, connections, or links, virtual private networks, biometrics, or so forth to upload, manage, and secure the data 126, generate tokens, and perform applicable transactions. As noted, the system 100 may be a blockchain system that utilizes a digital ledger to track transactions 128 involving the data 126 and advertisements 129. For example, the digital ledger may store the data 126, transactions 128, and advertisements 129 along with their details, information, and data. The devices 101 are representative of multiple devices that may be utilized by businesses or consumers. The devices 101 utilize any number of applications, browsers, gateways, bridges, or interfaces to communicate with the cloud system 114, platform 120, and/or associated components.

The data 126 may include a number of different data types. The data 126 may include information relating to the stock, shares, equity, holdings, and other interests of each user. The data 126 may include information relating to companies/partners/affiliates, associated products/services, purchase date, sale date, shares/ownership percentage, and other applicable information. The data 126 may also include demographic data, consumer data, family and health data, property data, interests and activity data, and other applicable types of data. Demographic data may be a combination of static and influx data points that include age, gender, occupation, marital status, education/education level, income level, religion, birthday, family size, and so forth. Demographic data, although mostly static, is commonly quite important to marketers and other interested parties. Consumer data may include websites visited, purchase plans, purchases, brand affinity, cars, clothes, travel, and other information applicable to users, clients, customers, groups, or so forth. The family and health data may include permanent or long-lasting data elements which may be helpful for predicting future purchases and include information related to family, health, and medical conditions, such as child care, diapers, diabetes, incontinence, rental information, and so forth. The family and health data have a large potential for cross marketing of data. Property data may include information regarding ownership, rentals/renters, address, for sale, occupants, pool, and vehicle ownership. This data may be treated and value as static data (even though changes are likely and expected). The interests and activity data may include data regarding hobbies, general interests, product and brand preferences, and other applicable influx data.

The wireless device 102, tablet 104, and laptop 106 are examples of common devices that may be utilized to receive and manage data 126, perform transactions 128, and communicate advertisements 129. Other examples of devices 101 may include e-readers, cameras, video cameras, audio systems, gaming devices, vehicle systems, kiosks, point of sale systems, televisions, smart displays, monitors, entertainment devices, medical devices, virtual reality/augmented reality systems, or so forth. The devices 101 may communicate wirelessly or through any number of fixed/hardwired connections, networks, signals, protocols, formats, or so forth. In one embodiment, the smart phone 102 is a cell phone that communicates with the network 110 through a 5G connection. The laptop 106 may communicate with the network 112 through an Ethernet, Wi-Fi connection, cellular, or other wired or wireless connection.

The data 126 may be collected and sourced from any number of online and real-world sources including, but not limited to, clearinghouses (e.g., stocks, credit card transactions, etc.), website traffic and cookie-based analytics, social media and application data, point of sale, purchase, and transaction history, loyalty programs and coupons, location-based email list for mailers, surveys and questionnaires, and other applicable sources. For example, the data 126 may include stock trading data, stock custody data, and consumer credit/debit card transaction data. The data 126 may also store information regarding a user's purchases (e.g., past, present, future, likely, etc.), interests (e.g., personal, commercial, etc.), business/business needs, and other applicable information. The data 126 may also store information regarding the family and friends of the user if authorized or requested by the user. As a result, the user may be able to support businesses and groups associated with friends and family as well by receiving targeted advertisements and potentially purchasing goods/services based on those advertisements.

These same data collection sources may be utilized to perform analysis of the data 126. In one embodiment, the data 126 may be captured through registered account information, programs/applications, website traffic, and tracking cookie-based analytics.

The data 126 may be captured through social media and applications. Social media data may be utilized to provide real-time polls, likes and dislikes, feedback, preferences for media content, site traffic, and numerous other consumer data. Any number of mobile, computing, personal assistant (e.g., Siri, Alexa, Cortana, Google, etc.), or other applications may be utilized. Social media data and interactions may be utilized as definitive or anecdotal data.

The data 126 may also be captured through point of sale, transaction, and purchase history. In one embodiment, a credit card clearing house may be utilized to capture the data. Customers, consumers, and clients may be comfortable with sharing the specific data points associated with point-of-sale transactions due to established practices. The point-of-sale transactions may include extensive data, including, but not limited to, name, address, item/service, price, credit card type, purchase location, date, brand preference, brand category, product affinity, spending levels, order history, inventory, restock data, purchase demographics, and so forth. Point-of-sale and transaction history data may have static, perennial, and influx data points with the value of each data point being tracked and measured within the data valuation index and the data derivatives marketplace.

The data 126 may also include location-based information and communications. An example of static and perennial data points that may be collected include a standard web form, email request form, wireless triangulation, routers/towers/access points reached, proximity beacons, and so forth. The location-based communications may capture data, such as email, consumer/business addresses, phone numbers, and so forth.

The data 126 may require and solicit additional data points and may also include surveys and questionnaires. Responses to surveys and questionnaires may be one of the best ways to gather and inform information regarding the user's stocks, holdings, shares, ownership, and interests that may not be able to be determined in other ways due to privacy, entity names, applicable laws, and so forth. The ability to gather real-world consumer insights may help complete or round out a user profile. The surveys and questionnaires may be performed digitally (e.g., websites, extensions, programs, applications, browsers, texting, or manually (e.g., audibly, on paper, etc.). Responses to surveys and questionnaires may help measure and achieve saturation of datapoints for user profiles.

The cloud system 114 may aggregate, manage, analyze, and process data 126 and tokens across the Internet and any number of networks, sources 131, and third-party resources 130. For example, the networks 110, 112, 114 may represent any number of public, private, virtual, specialty (e.g., trading, financial, cryptocurrency, etc.), or other network types or configurations. The different components of the system 100, including the devices 101 may be configured to communicate using wireless communications, such as Bluetooth, Wi-Fi, or so forth. Alternatively, the devices 101 may communicate utilizing satellite connections, Wi-Fi, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized. The networks, 110, 112, 114 of the system 100 may represent a single communication service provider or multiple communications services providers.

The sources 131 may represent any number of clearing houses, web servers, service providers (e.g., trading platforms, credit card companies, transaction processors, etc.), distribution services (e.g., text, email, video, etc.), media servers, platforms, distribution devices, or so forth. In one embodiment, the sources 131 may represent the businesses that purchase, license, or utilize the data 126, such as advertising or marketing goods and services utilizing the system 100. In one embodiment, the cloud system 114 (or alternatively the cloud network) including the data platform 120 is specially configured to perform the illustrative embodiments.

The cloud system 114 or network represents a cloud computing environment and network utilized to aggregate, process, manage, generate, sell, monetize, and distribute data 126 and advertisements 129 while supporting the transactions 128 and utilization. The cloud system 114 may implement a blockchain system for managing the data 126, transactions 128, and advertisements 129. The cloud system 114 allows data 126, transactions 128, and advertisements 129 from multiple businesses, users, managers, or service providers to be centralized. In addition, the cloud system 114 may remotely manage configuration, software, and computation resources for the devices of the system 100, such as devices 101. The cloud system 114 may prevent unauthorized access to data 126, tools, and resources stored in the servers 116, databases 118, and any number of associated secured connections, virtual resources, modules, applications, components, devices, or so forth. In addition, a user may more quickly upload, aggregate, process, manage, view, and distribute data 126 (e.g., profiles, updates, surveys, content, etc.), transactions 128, and advertisements 129 where authorized, utilizing the cloud resources of the cloud system 114 and data platform 120.

The cloud system 114 allows the overall system 100 to be scalable for quickly adding and removing users, businesses, authorized sellers, stock/interest-based information, transaction based information, analysis modules, distributors, valuation logic, algorithms, moderators, programs, scripts, filters, transaction processes, distribution partners, or other users, devices, processes, or resources. Communications with the cloud system 114 may utilize encryption, secured tokens, secure tunnels, handshakes, secure identifiers (e.g., passwords, pins, keys, scripts, biometrics, etc.), firewalls, digital ledgers, specialized software modules, or other data security systems and methodologies as are known in the art.

Although not shown, the cloud system 114 may include any number of load balancers. The load balancer is one or more devices configured to distribute the workload of processing the uploaded data 126 as well as applicable transactions to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, command communications, stream processing, etc.) between the devices 101 and the cloud system 114. For example, the cloud system 114 may offload verification of users that seek to be added to the system 100 along with applicable data 126 and information. Load balancing may be performed between automatic systems and devices as well as individual users. Other intelligent network devices may also be utilized within the cloud system 114.

The servers 116 and databases 118 may represent a portion of the data platform 120. In one embodiment, the servers 116 may include a web server 117 utilized to provide a website, mobile applications, and user interface (e.g., user interface 107) for interfacing with numerous users. Information received by the web server 117 may be managed by the data platform 120 managing the servers 116 and associated databases 118. For example, the web server 117 may communicate with the database 118 to respond to read and write requests. For example, the servers 116 may include one or more servers dedicated to implementing and recording blockchain transactions and communications involving the data 126, transactions 128, and advertisements 129. For example, the databases 118 may store a digital ledger for updating information relating to the user's data 126 and transactions 128 as well as utilization of the data 126 and transactions 128 to generate and communicate the advertisements 129.

The databases 118 may utilize any number of database architectures and database management systems (DBMS) as are known in the art. The databases 118 may store the content associated with each user/consumer/purchaser which may specify an address, name, age, demographics, interests, family/friend information, biometric identifiers, payment information, permissions, settings, location, cause preferences, cause restrictions, and so forth. Any number of secure identifiers, such as tones, QR codes, serial numbers, or so forth may be utilized to ensure that content, personal, or transaction information is not improperly shared or accessed.

The user interface 105 may be made available through the various devices 101 of the system 100. In one embodiment, the user interface 105 represents a graphical user interface, audio interface, or other interface that may be utilized to manage data, transactions, and other information. For example, the user may enter or update associated data utilizing the user interface 105 (e.g., browser or application on a mobile device). The user interface 105 may be presented based on execution of one or more applications, browsers, kernels, modules, scripts, operating systems, or specialized software that is executed by one of the respective devices 101. The user interface may display current and historical data as well as trends. The user interface 105 may be utilized to set the user preferences, parameters, and configurations of the devices 101 as well as upload and manage the data, content, and implementation preferences sent to the cloud system 114. The user interface 105 may also be utilized to communicate the advertisements 129 to the user. The devices 101 (e.g., displays, indicators/LEDs, speakers, vibration/tactile components, etc.) may present, play, display, or otherwise communicate the advertisements 129 visually, audibly, tactilely, or any combination thereof.

In one embodiment, the system 100 or the cloud system 114 may also include the data platform 120 which is one or more devices utilized to enable, initiate, generate, aggregate, analyze, process, and manage data 126, transactions 128, advertisements 129, and so forth with one or more communications or computing devices. The data platform 120 may include one or more devices networked to manage the cloud network and system 114. For example, the data platform 120 may include any number of servers, routers, switches, or advanced intelligent network devices. For example, the data platform 120 may represent one or more web servers that performs the processes and methods herein described.

In one embodiment, the logic engine 122 is the logic that controls various algorithms, programs, hardware, and software that interact to receive, aggregate, analyze, rank, process, score, communicate, and distribute data, content, transactions, alerts, reports, messages, or so forth. The logic engine 122 may utilize any number of thresholds, parameters, criteria, algorithms, instructions, or feedback to interact with users and interested parties and to perform other automated processes. In one embodiment, the logic engine 122 may represent a processor. The processor is circuitry or logic enabled to control execution of a program, application, operating system, macro, kernel, or other set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory 124 is a hardware element, device, or recording media configured to store data for subsequent retrieval or access at a later time. The memory 124 may be static or dynamic memory. The memory 124 may include a hard disk, random access memory, cache, removable media drive, mass storage, or configuration suitable as storage for data 126, transactions 128, instructions, and information. In one embodiment, the memory 124 and logic engine 122 may be integrated. The memory 124 may use any type of volatile or non-volatile storage techniques and mediums. In one embodiment, the memory 124 may store a digital ledger and tokens for implementing a blockchain processes.

In one embodiment, the cloud system 114 or the data platform 120 may coordinate the methods and processes described herein as well as software synchronization, communication, and processes. The third-party resources 130 may represent any number of human or electronic resources utilized by the cloud system 114 including, but not limited to, businesses, entities, organizations, individuals, government databases, private databases, web servers, research services, and so forth. For example, the third-party resources 130 may represent advertisement agencies, marketers, e-commerce companies, verification services, credit monitoring services, and others that pay for rights to use the data 126, track or provide information regarding the transactions 128, and create or monitor utilization of the advertisements 129.

In one embodiment, the data platform 120 may implement a blockchain ledger, manager, or technology. In another embodiment, the blockchain ledger may be accessible through sources 131. Any number of existing blockchain companies or providers may be utilized (e.g., Aeternity, Ethereum, Bitcoin, Dfinity, ContentKid, Blockphase, Chain of Things, Flowchain, Decissio, Cognate, SkyHive, Safe, etc.).

The blockchain is utilized as a way to store and communicate the data 126, transactions 128, and advertisements 129. The blockchain may utilized one or more distinct ledgers for different entities, services providers, types of data, users, or so forth. For example, each new user with data received by the data platform 120 is assigned a token or other secure identifier. In one embodiment, the digital tokens may be managed utilizing a key that allows the user or controlling party to access the ledger. In one example, the tokens may be controlled by the user or control may be reassigned. The blockchain may cross-reference updates to the data 126 with the original record for the data platform 120 to ensure proper maintenance, control, licensing, management, and transactions. In one example, different licensing tiers, pricing algorithms, license verification, cause information, and payments are combined to create a unique platform. The illustrative embodiments provide a system 100, cloud system 114, and data platform 120 for using user data, specifically stocks, equities, ownership, holdings, and interests, to generate selective or targeted advertising. The illustrative embodiments are performed based on the user's request, authorization, or approval to apply with all applicable laws.

The blockchain may also utilize any number of payment systems (e.g., PayPal, Venmo, Dwolla, Square, wire transfers, credit cards, Quicken, etc.) to receive money and distribute payments to the applicable party. In one embodiment, the data platform 120 may receive a small fee or percentage per transaction, data uploaded/updated, data purchased, shared, or licensed, purchased item, browsing session, or so forth. In one embodiment, the data platform 120 may be utilized to verify users and advertisers (as well as other users/entities that utilize the data platform 120) and associated data 126 and transactions 128 associated with the data 126.

The third-party resources 130 may represent any number of electronic or other resources that may be accessed to perform the processes herein described. For example, the third-party resources 130 may represent government, private, and charitable servers, databases, websites, programs, services, and so forth for verifying the data 126, transactions 128, and the advertisements 129. In another example, auditors may verify the advertisements 129 are actually generated based on the data 126 including the transactions 128.

Various data and venue owners that access the data platform 120 may legally extract and tokenize the data 128, transactions 128, and advertisements for use in the exchange provided by the system 100 by identifying and tracking data utilizing automatic data extraction tools. Any number of privacy and data policies may be implemented to ensure that applicable local, State, Federal, and International laws, standards, and practices are procedures are met.

In one embodiment, a user or consumer group represented by a user of the devices 101 or the sources 131 may elect and receive permission to collect observational data collected from secure and authorized systems to achieve access to partial or complete data from the sources 131 (e.g., professional drivers, human resources, prison records, property values, real estate sales, retail sales, retail prices, commerce, waste stream data, etc.).

The logic engine 122 may also perform valuation of the data 126 and advertisements as is taught by U.S. provisional patent application 62/755,815 entitled "Method and System for Data Valuation and Secure Commercial Monetization Platform" and filed Nov. 5, 2018 and as is taught by U.S. provisional patent application 62/826,457 entitled "Method and System for Data Futures Platform" filed Mar. 29, 2019 which are hereby incorporated by reference in their entirety. The illustrative embodiments may also support third-party utilization of the data 126 and transactions 128 to generate the advertisements 129. Various authorization, auditing, and validation processes may be performed by auditing groups, commissions, industry groups, or other professionals/entities. The various embodiments may also allow a user to donate the value of their data 126 and transactions 128 and consumption of advertisements 129.

In one embodiment, the logic engine 122 may utilize artificial intelligence. The artificial intelligence may be utilized to enhance data 126, analyze transactions 128, and generate advertisements 129 to increase value, utilization, effectiveness, and profits. For example, artificial intelligence may be utilized to review, authenticate, and validate data and transactions that are received by the system 100. The artificial intelligence of the logic engine 122 may be utilized to ensure that the data 126 is improved, accurately analyzed, and value increased. For example, it is expected that data and the associated tokens that are validated utilizing artificial intelligence may be given a premium value by advertisers.

In another embodiment, the devices 101 may include any number of sensors, appliances, and devices that utilize real time measurements and data collection to update the data 126. For example, a sensor network, wearables (e.g., watches, bands, implantable devices, etc.) and Internet of things (IOT) devices may gather user and behavioral data. The data platform 120 may also work in conjunction with hands-free data mining and measurement tools that tracks location, activity, and video-based marketing data (e.g., from GPS location, video from storefronts, beacon detection, proximity alerts, etc.) from any number of third-party sources. The user may be tracked through any number of environments, locations, and conditions. The advertisements 129 may also be generated based on the activities, actions, and location of the user.

In one embodiment, the data platform 120 may extract data from third-party platforms by opting in and providing user credentials to various applications (e.g., Charles Schwab, TD Ameritrade, E*Trade, Vanguard, Fidelity, Merrill Lynch, etc.) the data platform 120 may extract data from the sources 131.

Figure 2:
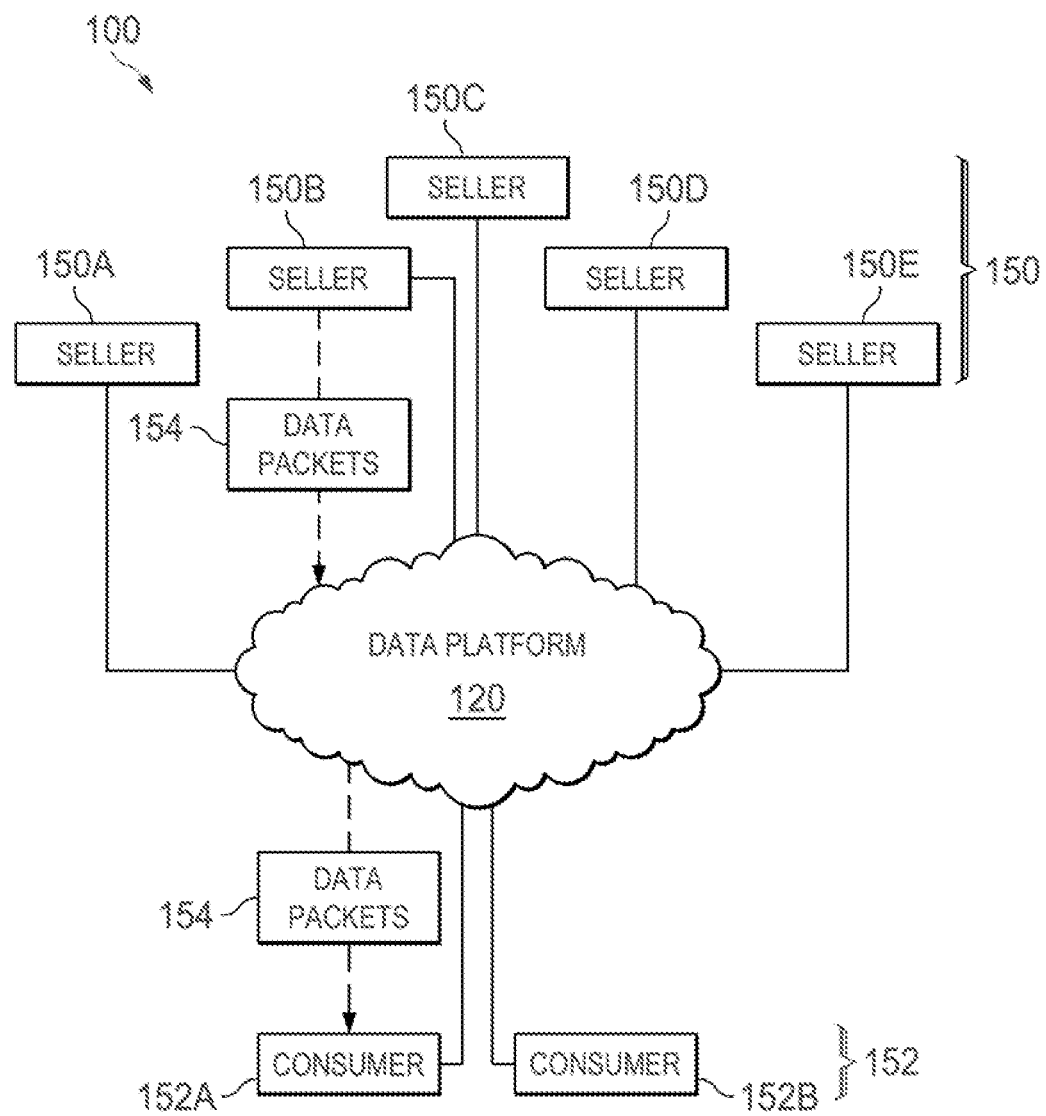
FIG. 2 further illustrates portions of the system of FIG. 1 in accordance with an illustrative embodiment.

FIG. 2 further illustrates portions of the system 100 of FIG. 1 in accordance with an illustrative embodiment. As shown the advertisers 150A-E (jointly advertisers 150) may represent the sources 131 of FIG. 1. The sellers 150 may represent any number of exchanges, platforms, clearinghouses, advertisers, marketers, businesses, retailers, service providers, individuals, organizations, entities, or so forth referred to as sellers 150 or businesses for purposes of simplicity. The consumers 152A, 152B (jointly consumers 152) represent any number of users, consumers, groups, or individuals that have data 154 (also including transactions) that is utilized to allow targeted advertisements 155 to that they are willing to allow the sellers 150 to access through the data platform 120. In one embodiment, the data platform 120 may represent all or portions of the system 100 of FIG. 1 (including the cloud system 114, servers 116, and databases 118).

The consumers 152 may actively or passively upload data 154 to the data platform 120. The data platform 120 may also receive amended, updated, or add additional data 154 for the consumers 152 at any time as described herein. The consumers 152 may have an agreement (e.g., contract, terms of services, permissions, authorizations, etc.) for the utilization of the data 154 by the sellers 150 or other interested parties to generate the targeted advertisements 155. The agreement or contract may specify how, when, and what portions of the data 154 may be used as well as the associated compensation terms. The agreement may specify that the data 154 may be processed, analyzed, purchased, licensed, rented, leased, or otherwise managed by the data platform 120 for the mutual benefit of the consumers 152 and the sellers 150. For example, the consumer 152B may elect to receive targeted advertisements 154 to support the companies, organizations, entities, or other groups in which the consumer 152B has stock, ownership shares, interests, holdings, or a vested interest. The consumer 152B may be interested in the targeted advertisements 154 to support herself or to support family and friends. In another example, the consumer 152B may elect to license use of their data 154 such that they are compensated utilizing a digital currency (or hard currency) for each access of or utilization of their data 154 by the sellers 150.

The data platform 120 may process raw consumer data to generate the targeted advertisements 155. The targeted advertisements 155 may be desirable to the user because the targeted advertisements 155 support the companies, stock, holdings, ownership, or interests of the user. In one embodiment, a term or logo utilized with each of the advertisements may indicate that the targeted advertisements are for the benefit of the user. In one embodiment, the targeted advertisement 155 may even include the stock ticker, name of the company, user's name, key word, identifier, certification, or so forth indicating that the targeted advertisement has gone through the analysis, authorization, and vetting process herein described.

The data platform 120 performs valuation of the data 154 and targeted advertisements 155 based on information from any number of sources including current rates, contracts, indices, exchanges, and other applicable information. For example, current targeted advertisement rates may be utilized to value the data. The tokens paid to the consumers 152 in exchange for the data 154 may vary based on the volume, quantity, verification, and types of information included in the data 154. The data platform 120 normalizes data monetization for the consumers 152 and sellers 150. Compensation performed by the data platform 120 may be performed utilizing digital currencies or hard currencies. In one embodiment, blockchain-based currencies may be utilized to compensate the consumers 152. Full tokens or partial tokens may be utilized to most accurately represent the values being exchanged. There may be a predefined number of tokens available thereby allowing early adopters of the system 100 to earn more over time. For example, in response to the consumer 152A selling or granting access to the data 154 to the data platform 120 or the seller 150B, the consumer may be compensated with tokens (e.g., Bitcoin, Ethereum, proprietary tokens, etc.). All or portions of the data 154 may be involved in a transaction. For example, in addition to stock, ownership, equities, and interest, the data 154 may include numerous components relating to all aspects of the life, work, hobbies, entertainment, studies, politics, health, family, consumer habits, for the consumer 152B. Not all of the sellers 150 may sell products, goods, or services that correspond to the stocks, holdings, and interests of the consumers 150. The seller 150D may only license rights to temporarily (e.g., for one year) access the consumer habits of the consumer 152B existing and updated in real-time. The exchange for the tokens may include a pointer to a secure storage or vault accessed through the data platform 120. The pointer may be an encryption key, access information, unique identifier, or other security information for accessing the data 154 associated with the user. In another embodiment, security tokens used for the blockchain may also be embedded with the data 154. The tokens granted through the data platform 120 may vary in value, may be fixed, or may act similar to other monetary instruments (e.g., stocks, bonds, certificates of deposit, etc.) for a specified original value of the data 154.

The data platform 120, sellers 150, or consumers 152 may keep and maintain digital ledgers that track the transactions within the system 100 to verify and authenticate the data 154, advertisements 155, and associated transactions. The sellers 150 may utilize the data 154 to advertise, sell, or market goods, services, products, perform market research, generate analytics, and otherwise generate and communicate the advertisements 155 and communicate the advertisements 155 to the consumers 152. As previously noted, the data platform 120 may also represent one or more processing, analysis, blockchain, or distribution centers, systems, devices, facilities, or so forth. The sellers 150 and consumers 152 may represent any number of individuals or groups (e.g., hundreds, thousands, millions, etc.).

As noted, the sellers 150 may send or distribute goods and services associated with the advertisements 155 through the cloud system or directly to the consumers 152. In one embodiment, the seller 150B may distribute goods and services 154 to the consumer 152A through the data platform 120. The data platform 120 may perform distribution of the goods and services 154. For example, the data platform 120 may include any number of physical storages, digital storage, warehousing, and distribution systems, facilities, professionals, employees, contractors, electronics, and so forth.

Figure 3:
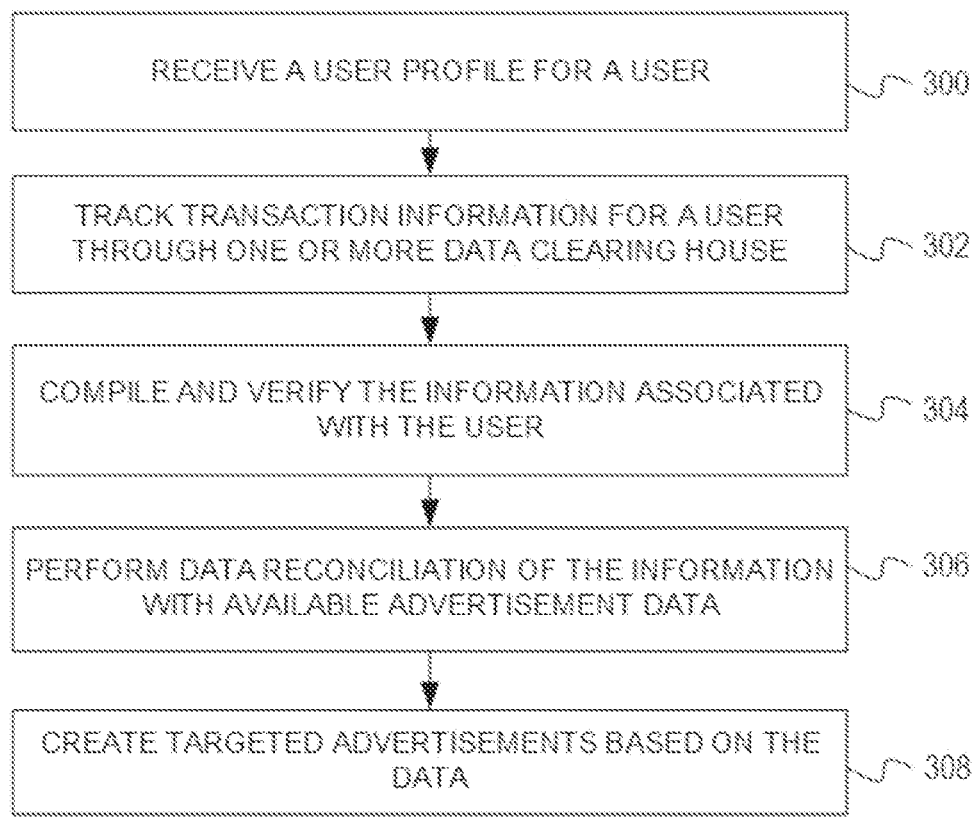
FIG. 3 is a flowchart of a process for creating targeted advertisements in accordance with an illustrative embodiment.

FIG. 3 is a flowchart of a process for creating targeted advertisements in accordance with an illustrative embodiment. The process of FIGS. 3-6 may be performed by a platform, device, server, or other equipment in accordance with illustrative embodiments (see for example the devices, servers, systems, and equipment of FIG. 1). All or portions of the process of FIGS. 3-6 may be performed automatically. The process of FIG. 3 may be implemented by a system or platform, such as the system 100, data platform 120, or devices 101 of FIG. 1 referred to generically herein as the platform.

In one embodiment, the process of FIG. 3 may begin by receiving a user profile for a user (step 300). The user profile may be generated or determined from already available information for the user. For example, the user profile may represent one or more profiles compiled by devices, accounts, services, or so forth. The user may provide answers utilizing one or more surveys, fields, questions, or other applicable information and data to determine applicable information and data. In one embodiment, step 300 may be an optional step or one that is performed over time before or after the other steps of FIG. 3. The user profile may also represent a user account or data.

Next, the platform tracks transaction information for a user through one or more data clearinghouses (step 302). The platform may track multiple types of information, data, and transactions (referred to herein as "information"). In one embodiment, the transaction information relates to stock purchases, transactions, or exchanges performed by or otherwise associated with the user. A multi-party stock purchase verification process may be utilized to confirm every applicable stock transaction. For example, the transaction information may include the stock name, ticker, date of transaction, number of shares involved, price of the shares, commissions, fees, taxes, type of transaction (e.g., market, limit, futures, short sale, option, etc.). The transaction information may also be referred to as portfolio or investment information. The clearinghouses may represent any number of platforms, brokers, exchanges, The transaction may also be applicable to any number of equity purchases (e.g., funds, shares, ownership, investments, interests, etc.). As noted, the transaction may represent any number of real-time, contingent, contractual based, delayed, or other transactions or pre-existing or current rights, ownership, or interests. The transaction information may be received from a data clearinghouse. For example, the platform may have an agreement with the data clearinghouse to receive the applicable information. The user may also be required to give permission for the platform to receive, analyze, process, and present information based on available data. The transaction information may also relate to a credit card, debit, or service purchase (e.g., PayPal, Venmo, Zelle, etc.). For example, credit card swipes, chip readers, online transactions, or other applicable transactions or exchanges may be recorded, monitored, or otherwise documented. The transaction information may similarly include the date, purchased item/service, user or users associated with the purchase, type of card/service, purchase amount, and so forth. Other types of information and data may be determined from the applicable transaction.

Next, the platform compiles and verifies the information associated with the user (step 304). The information associated with the transactions that are tracked during step 302 may be verified to ensure accuracy of the results as generated (e.g., targeted advertisements). The information may be verified utilizing any number of processes. For example, the transaction information may be reconciled utilizing online accounts, third-party services, email receipts, or other applicable information. The illustrative embodiments are unique in the ability to cross-confirm and record each unique stock, equity, or interest-based transaction thus creating a continually evolving data record of stock portfolio ownership and user interests that may be used to provide informed purchase decisions that are directly aligned with the user's/investors portfolio of investments. As a result, individuals, families, or groups may make better informed decisions. The platform may also analyze mutual funds, index funds, exchange traded funds (ETFs) pensions, hedge funds, and other complex holdings and portfolios to determine the holdings and interests of the user in their various proportions.

Next, the platform performs data reconciliation of the information with available advertising data (step 306). In one embodiment, a data reconciliation engine may review the applicable information to determine products/services that align with the stocks and interests of the user. For example, the user may need to perform search engine optimization for her small business, the platform may determine during step 306 that the user also owns shares in an Internet search company. As a result, search engine optimization services available through the Internet search company may be presented to the user as her best option. The user may be obtaining a needed service while also being a patron of the company that she holds shares in. Where the user owns multiple stocks, equities, interests, or holdings in companies that offer applicable services, the platform may analyze which company may most benefit from increases in revenue based on the user's spending. In one embodiment, the platform may determine a portfolio of potential advertisements for goods and services associated with the user's stocks, equities, interests, and holdings. As a result, the advertisements may be readily available in real-time or near real-time.

Next, the platform creates targeted advertisements based on the information (step 308). The targeted advertisements may represent any number of advertisements displayed to the user including Internet advertisements, in-application advertisements, television/video/Internet Protocol Television advertisements, radio/Internet radio, print advertisements, and other forms of advertisements. In one embodiment In one embodiment, the process of FIG. 3 may begin in response to a selection made by the user to opt-in to targeted advertisements that benefit the user's interests rather than random advertisements. For example, the selection may involve the acceptance of financial or legal language utilizing a graphical user interface presented utilizing a web interface, mobile application, or so forth. The selection may be to receive targeted advertisements rather than generic advertisements or advertisements that are not associated with the user's stocks, holdings, and interests. In one embodiment, a profile associated with the platform may specify the companies, organizations, entities, or other groups that the user would like to support. In some examples, the various groups may represent stock, equity, interests, or holdings, but the groups may also represent companies associated with the user's friends or family. For example, if a family member is a pilot for a particular company, the user may choose to support that airline company by receiving targeted advertisements that benefit the airline directly or indirectly. The user profile referenced in step 330 may also include any number of settings, configurations, parameters, selections, releases, authorizations, verification requirements, or other information and data that controls how the user's data is utilized in accordance with the illustrative embodiments. The user referenced in FIG. 3 may also refer to a group of people, entity, organization, associated persons, or so forth. The data may also be referred to as personal data, consumer data, private data, monetized data, authorized data, advertising data, or marketing data.

Figure 4:
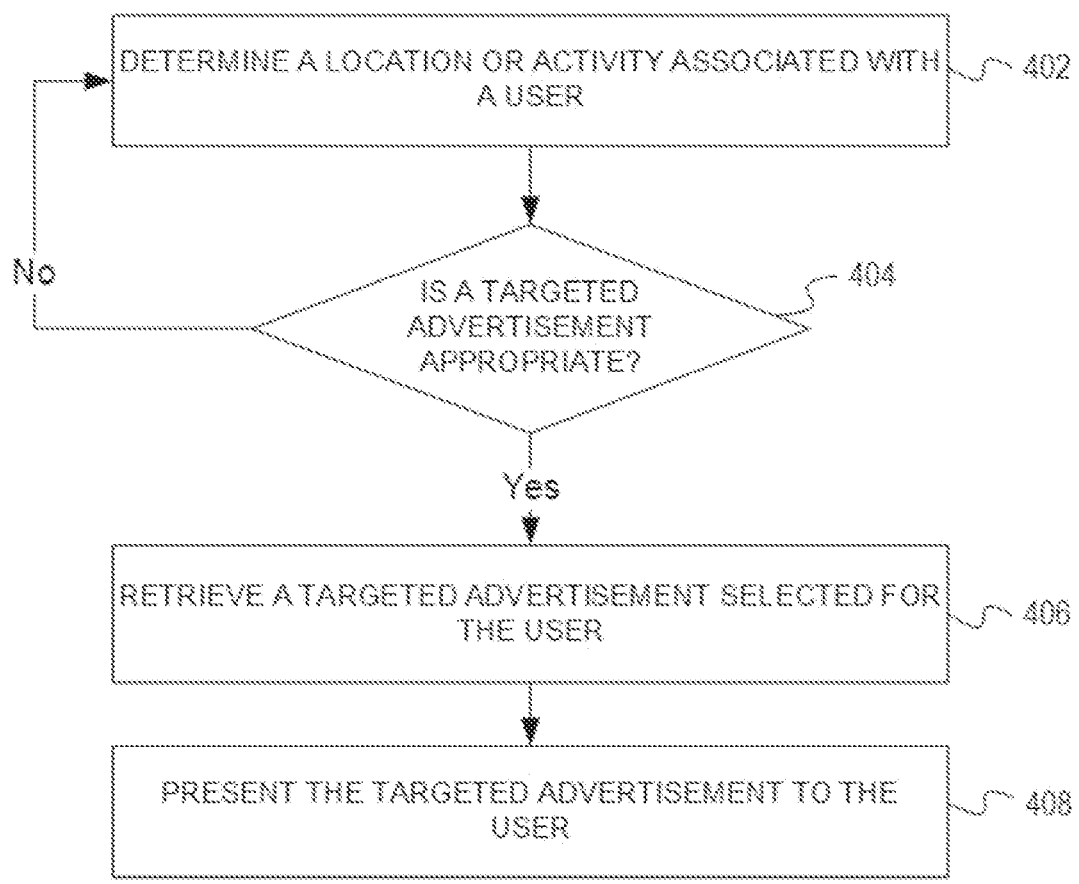
FIG. 4 is a flowchart of a process for utilizing targeted advertisements in accordance with an illustrative embodiment.

FIG. 4 is a flowchart of a process for utilizing targeted advertisements in accordance with an illustrative embodiment. The process of FIG. 4 may be implemented with or as a separate process from of FIG. 3. In one embodiment, the process of FIG. 4 may begin by determining a location or activity associated with a user (step 402). In one embodiment, one or more wireless devices associated with the user may be utilized to determine the location or activity of the user (e.g., smartphone, wireless earbuds, smartwatch, fitness tracker, gaming device, automotive GPS, etc.). The location and activities of the user may also be determined from any number of external devices, such as security systems (e.g., home, commercial, etc.), beacons, camera systems, radio frequency detectors, routers, cell towers, or other communications, computing, or advertising equipment, systems, and/or devices. The location and activities of the user may also be determined utilizing browsers, applications, or so forth. For example, the user may be browsing the Internet, playing a game, taking pictures on vacation, at the grocery store, walking the mall, at a sporting event, volunteering, or performing any number of activities.

Next, the platform determines whether a targeted advertisement is appropriate (step 404). The targeted advertisement may be appropriate based on location, activities/actions, user preferences, and so forth. There may be circumstances during which some or all targeted advertisements are not appropriate, such as selected no advertisements times, locations, or activities (e.g., funerals, vacation days, etc.). In one embodiment, the user preferences may specify how, when, and where specific targeted advertisements are shown to the user. The platform may also learn over time utilizing artificial intelligence or machine learning the types of locations, times, and activities during which it is inappropriate to display a targeted advertisement.

Next, the platform retrieves a targeted advertisement selected for the user (step 406). The targeted advertisement may be retrieved from a portfolio, queue, or other storage of advertisements. In one embodiment, the targeted advertisements may be pre-prepared for the user. As a result, the targeted advertisement may be selected based on previous processing of applicable information. The platform may have previously generated a matrix or database of products/services associated with the stocks, companies, interests, and holdings of the user. As a result, the best targeted advertisement may be selected for the user. In another embodiment, the targeted advertisements may be determined or generated in real-time. For example, the type of targeted advertisement may change based on the location, activity, or actions of the user. For example, advertisements for restaurants associated with the stock holdings of the user may be made based on the location of the user. For example, multiple restaurants as well as their associated specialties/themes/menus, reviews, location/directions, and contact information may be presented to the user.

Next, the platform presents the targeted advertisement to the user (step 408). The targeted advertisements may be presented to the user utilizing visual, audio, video, tactile, print, or other mediums. For example, Internet advertisements, in-application advertisements (e.g., YouTube, Facebook, games, Pandora, etc.), video, audio, and other advertisements may be presented to the user through available devices, systems, or equipment, such as smart televisions, wireless devices (e.g., cell phones, tablets, laptops, etc.), gaming devices, and so forth. In one embodiment, the user may be coached in real-time to select goods or services that have a benefit for their portfolio. Their portfolio may also support family, friends, charitable causes, or so forth. The targeted advertisements may give specific details to the user of how she is supporting her own portfolio by selecting to view or purchase specified goods and services.

In one embodiment, the targeted advertisements may be printed or generated in real-time for delivery or communication to the user. For example, print advertisements may be placed in a room where the user will be spending time (e.g., a conference room, hotel room, mass transit, taxi/Uber, or other location. The print advertisements may be generated on traditional paper, electronic paper that may be reused repeatedly, or other print or electronic print materials.

In one embodiment, the user may periodically be presented with goods/services that align with her stocks, holdings, and interests. The information may be presented as spreadsheets, marketing pieces/advertisements, summaries, and so forth. The presented information may be informational, data focused, visual, or advertising driven and may be presented electronically (e.g., e-mail, text messages, in-application messages, dedicated websites/preferences, videos, audio, etc.), printed, or otherwise sent.

The illustrative embodiments allow the user to collaborate their spending efforts for the benefit of their own portfolio. Rather than making random selections of goods and services, the user may make purchases that advance their own interests (including family, friends and charitable causes, where selected). Where the user has multiple potentially conflicting interests associated with competing goods and services, share information, performance information, or other details may be shared with the user. The user's portfolio may be applicable to mutual funds, index funds, hedge funds, pensions, and other investments. Special affiliations, discounts, remittances, and other relevant information may also be utilized by an algorithm or presented to the user.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible or non-transitory medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications mediums.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 5:
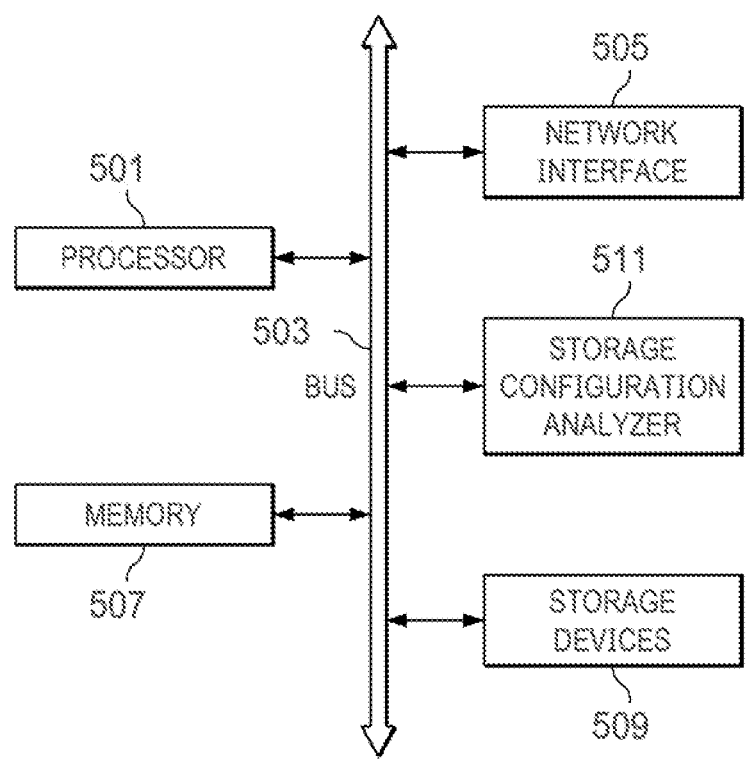
FIG. 5 depicts a computing system in accordance with an illustrative embodiment.

FIG. 5 depicts a computing system 500 in accordance with an illustrative embodiment. For example, the computing system 500 may represent a device, such as one or more of the devices 101 of FIG. 1. The computing system 500 includes a processor unit 501 (possibly including multiple processors, multiple cores, multiple nodes, and/or implementing multi-threading, etc.). The computing system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include one or more functionalities that store content, blockchain data, parameters, application, user profiles, and so forth. Code may be implemented in any of the other devices of the computing system 500. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 601.

Figure 6:
FIG. 6 is a pictorial representation of a targeted advertisement in accordance with an illustrative embodiment.

FIG. 6 is a pictorial representation of a targeted advertisement 600 in accordance with an illustrative embodiment. The targeted advertisement 600 may be presented in a paper, brochure, newspaper, e-paper, digital format, or other hard copy, digital or virtual format. The targeted advertisement 600 may be communicated, presented, or played by a wireless device, cell phone, tablet, e-reader, virtual device, gaming device, heads-up display, projection, hologram, or other applicable device in a visual, audio, and/or tactile format.

In one embodiment, the targeted advertisement 600 may present personal information, such as the name of the user, company, organization, entity, family, or other individual or group that the targeted advertisement 600 is addressed to. For example, the targeted advertisement 600 may include a name or other personal information (e.g., username, need, last name, nickname, etc.) where authorized, permitted, legal, or approved by the user.

The content in the targeted advertisement 600 may be generated based on the information determined (see FIG. 3). For example, the targeted advertisement 600 may be generated for a provider that provides goods, products, and/or services of interest to the user, such as promotional videos, search engine optimization (SEO), webpage optimization, and marketing/digital consulting.

The targeted advertisement 600 may communicate information regarding any number of goods and services. As previously noted, the targeted advertisement 600 may be generated based on permissions, settings, user profiles, authorizations, or other applicable information. As noted, the utilization of the targeted advertisement 600 as well as any applicable monetization may be tracked utilizing blockchain information and data.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A system for solving digital advertisement targeting inefficiencies and securing sensitive investment data, comprising:
   a plurality of electronic devices comprising processors and memory executing a data application through an application server, the data application determines investment information associated with a user, wherein the data application utilizes encrypted communications protocols for data transmission;
   a data platform based on secure blockchain management, the data platform comprising a logic engine in communication with a database management system, the data platform accessible by the plurality of electronic devices through one or more secure networks, wherein the data platform executes the data application to receive the investment information for the user through secure channels, converts raw investment data into secure digital assets by tokenizing the investment information for the user in one or more blockchain tokens stored in a digital ledger utilizing a tokenization module, reconciles the investment information for the user with available advertising content that financially supports companies or organizations associated with the investment information utilizing a reconciliation module configured to apply machine learning to address the digital advertisement targeting inefficiencies, automatically creates targeted advertisements based on the one or more blockchain tokens and the available advertising content that financially supports the companies or organizations associated with the investment information for the user utilizing an advertisement module, and communicates the targeted advertisements to the user through user interfaces of the plurality of electronic devices after verifying the user, wherein the user interface utilizes secure identifiers or biometrics to perform verification of the user.

2. The system of claim 1, wherein the investment information is a portfolio of the user including one or more of stocks, equities, holdings, or interests associated with the user.

3. The system of claim 1, wherein the data platform receives a user profile associated with the user through at least one of the plurality of electronic devices.

4. The system of claim 1, wherein the plurality of electronic devices include one or more clearing houses, and wherein the one or more clearing houses represent at least trading clearing houses and credit card clearing houses.

5. The system of claim 1, wherein the targeted advertisements support the portfolio of the user determined from the investment information.

6. The system of claim 1, wherein the data application automatically determines the investment information utilizing a profile of the user including one or more financial services utilized by the user.

7. The system of claim 1, wherein the data platform determines whether the targeted advertisement is appropriate for the user based on the location and activity of the user before communicating the targeted advertisement to the user.

8. The system of claim 1, wherein the data application is configured to receive user preferences associated with the user.

9. The system of claim 8, wherein the targeted advertisements are generated utilizing the user preferences.

10. The system of claim 1, further comprising:
    a database in communication with the data platform wherein the database saves the investment information.

11. The system of claim 8, wherein the user preferences specify how the investment information is utilized by the data platform.

12. A system for solving digital advertisement targeting inefficiencies and securing sensitive investment data, comprising:
    a plurality of electronic devices comprising processors and memory executing a data application through an application server, the data application automatically determines investment information associated with a user through interfacing with data clearing houses, wherein the data application utilizes encrypted communications protocols for data transmission;
    a data platform configured as a secure blockchain-based data management platform comprising a logic engine, the data platform accessible by the plurality of electronic devices through one or more secure networks, the data platform executes the data application to tokenize the investment information associated with the user in one or more blockchain tokens, automatically creates targeted advertisements based on the one or more blockchain tokens and the available advertising content that financially supports companies or organizations associated with the investment information associated with the user, and communicates the targeted advertisements to the user through user interfaces of the plurality of electronic devices after verifying the user, wherein the user interface utilizes secure identifiers or biometrics to perform verification of the user; and
    a database management system in communication with the data platform storing the investment information, the available advertising data, and the targeted advertisements.

13. The system of claim 12, wherein the data platform is configured to compensate the user for sharing the investment information utilizing cryptocurrency.

14. The system of claim 12, converting the cryptocurrency to hard currency.

15. The system of claim 12, wherein the investment information is a portfolio of the user including one or more stocks, equities, holdings, or interests associated with the user.

16. The system of claim 12, wherein the data platform tracks transactions of the user through one or more data clearing houses.

17. The system of claim 12, wherein the data platform determines a location or activity associated with the user; and determines whether the targeted advertisement is appropriate in response to the location or the activity of the user.

18. The system of claim 12, wherein the data platform receives user preferences associated with the user, and wherein the targeted advertisements are generated utilizing the user preferences.

19. The system of claim 18, wherein the user preferences specify how the investment information are utilized by the data platform.

20. The system of claim 12, wherein the user is compensated for sharing the investment information utilizing the one or more blockchain tokens.

* * * * *